United States Patent [19]

Lew

[11] Patent Number: 5,419,619
[45] Date of Patent: May 30, 1995

[54] HUBLESS WHEEL

[75] Inventor: Paul E. Lew, Carmel, Ind.

[73] Assignee: Wear and Tear, Inc., Indianapolis, Ind.

[21] Appl. No.: 169,582

[22] Filed: Dec. 17, 1993

[51] Int. Cl.$^6$ ............................................. B60B 19/00
[52] U.S. Cl. ...................................... 301/5.1; 301/1; 305/7
[58] Field of Search .................. 301/1, 5.1, 63.1, 111, 301/105.1; 305/7, 6

[56] References Cited

U.S. PATENT DOCUMENTS

| | | | |
|---|---|---|---|
| 858,489 | 7/1907 | Vaughan | 305/7 |
| 917,967 | 4/1909 | Schmitz | 305/7 |
| 1,167,307 | 1/1916 | McCandless | 305/7 |
| 1,566,467 | 12/1925 | Iznaga | 305/7 |
| 2,843,426 | 7/1958 | Nojima | 305/7 X |
| 3,194,583 | 7/1965 | Nottage | 305/7 |
| 3,329,444 | 7/1967 | Lidov | 280/210 |
| 4,045,096 | 8/1977 | Lidov | 305/7 |
| 4,465,321 | 8/1984 | Berg | 301/5 R |
| 4,735,459 | 4/1988 | Massonnet | 301/5.1 X |
| 5,071,196 | 12/1991 | Sbarro | 301/5 R |

*Primary Examiner*—Russell D. Stormer
*Attorney, Agent, or Firm*—Baker & Daniels

[57] ABSTRACT

A hubless wheel for a vehicle which provides advantageous weight and aerodynamic properties. The wheel includes a rotationally stationary inner hoop, coupled to the vehicle, and a rotatable outer hoop, concentric with the inner hoop. The inner hoop and outer hoop are both fabricated with a woven fiber composite shell. A ground engaging tread is disposed on the radial periphery of the outer hoop. Bearings, preferably three rotating bearings spaced circumferentially around the inner hoop at approximately 120° intervals, are mounted on the inner hoop to be rotationally stationary therewith and each include a support surface on their respective radial peripheries. The support surface is particularly contoured to operatively engage a bearing engaging surface located on the inner periphery of the outer hoop. The outer hoop is axially and radially supported relative to the inner hoop through this engagement to allow rotation therebetween.

22 Claims, 6 Drawing Sheets

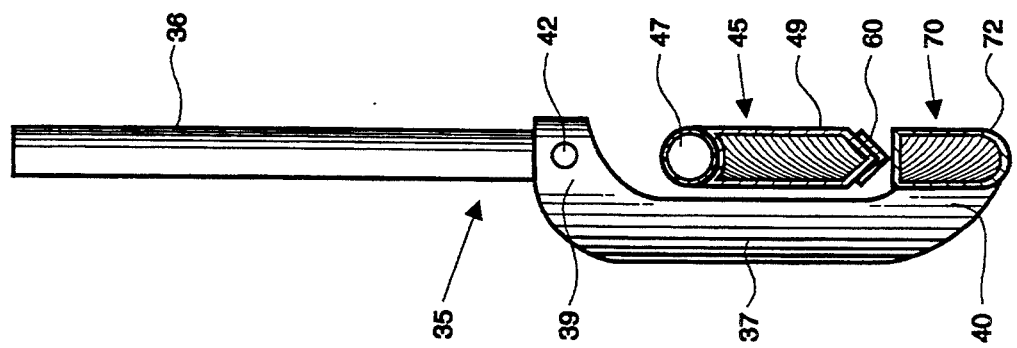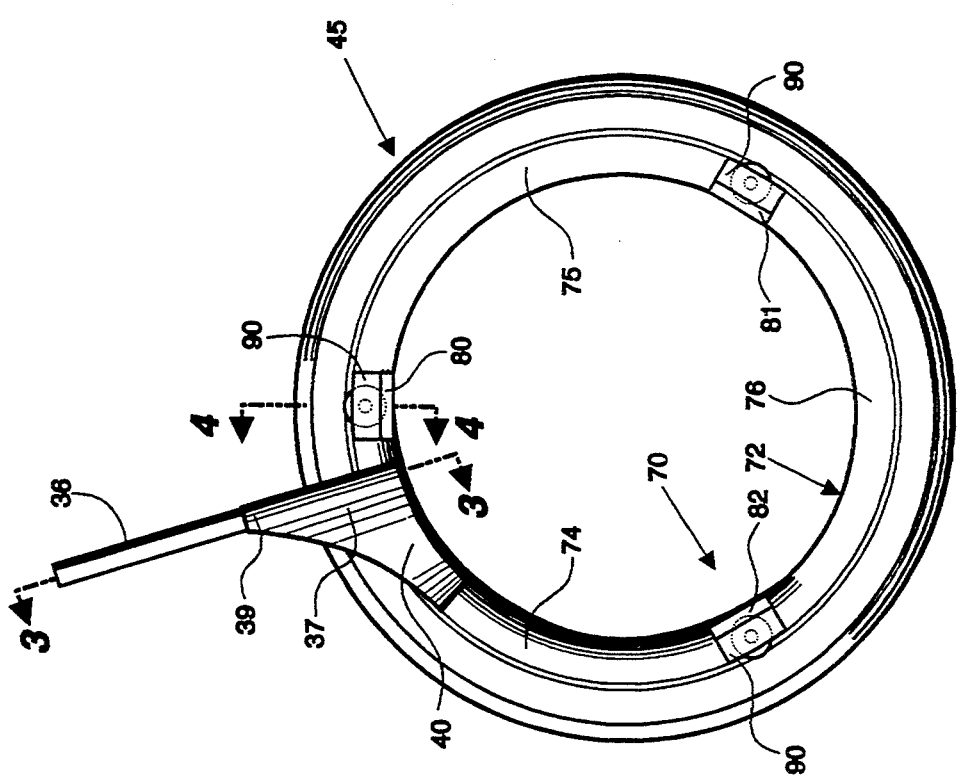

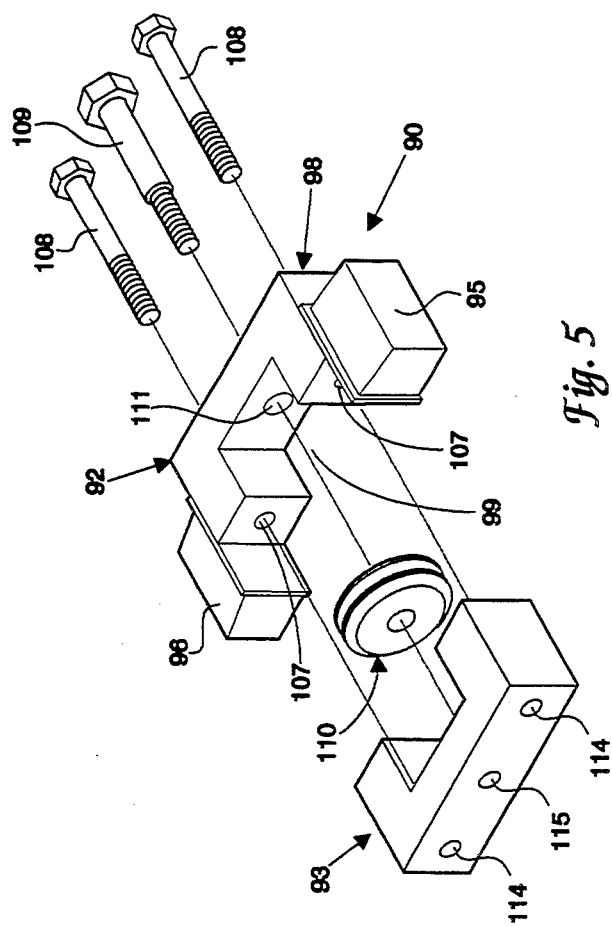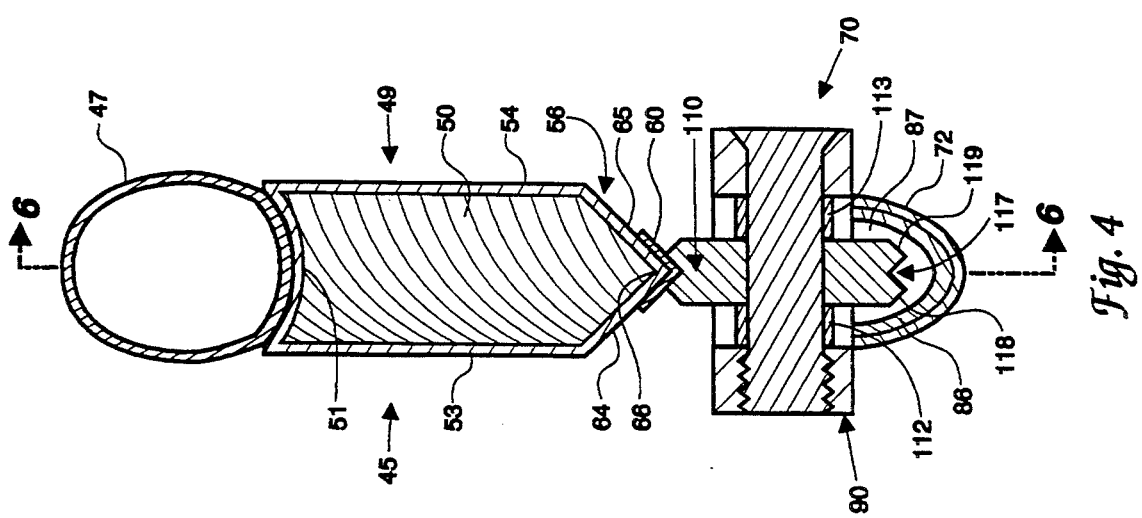

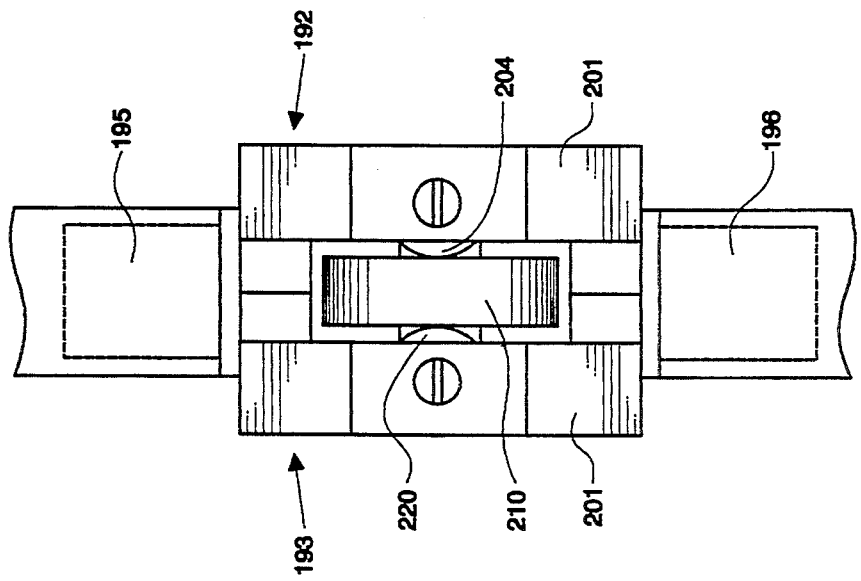
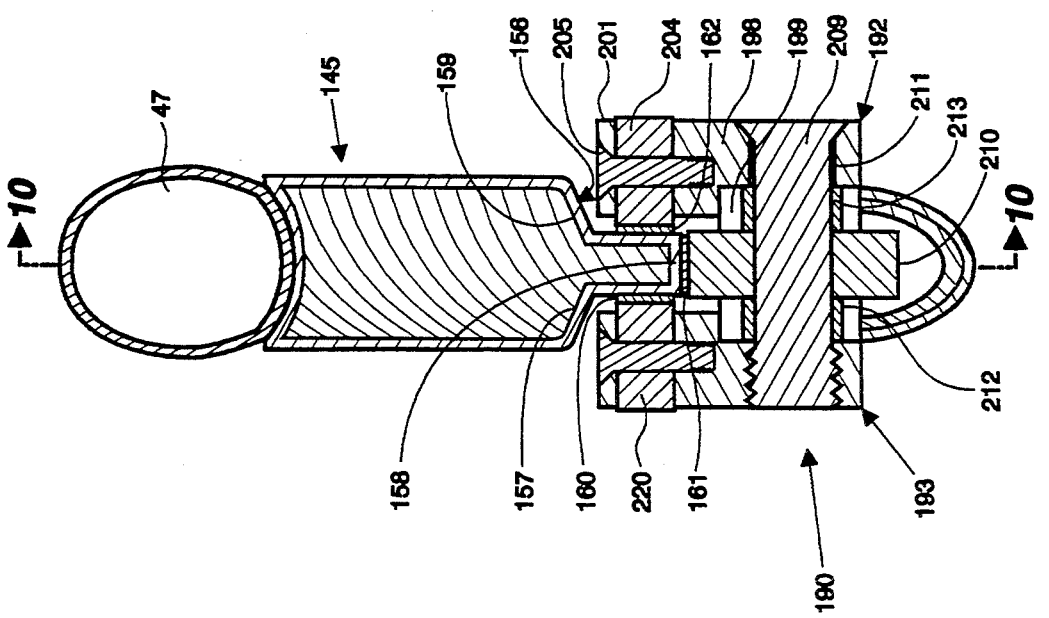

HUBLESS WHEEL

BACKGROUND OF THE INVENTION

This invention relates to wheels for vehicles such as bicycles and wheelchairs, and, in particular, to hubless wheels designed to lessen the weight and improve the aerodynamics of the vehicle.

Speed sport athletes such as cyclists continue to seek bicycle equipment improvements which gain them an advantage in racing competitions. Bicycle wheels are one type of equipment specifically targeted for improvement, as designers attempt to develop wheels with improved weight and aerodynamic characteristics relative to existing bicycle wheels. Previous wheel enhancements which decrease wheel weight have been accomplished by modifying the materials of wheel construction. For instance, heavy metal wheel rims of the past have been replaced with lower weight, high strength composites. These composites are typically carbon fiber composite shells having filled, lightweight cores constructed from, for instance, various foam materials, balsa wood, or NOMEX TM.

While altering the materials of construction has achieved lower wheel weights, standard wheel designs continue to suffer from a major shortcoming. Specifically, the wheel hub and its associated spokes and bicycle frame tripletree detrimentally affect both the aerodynamic and weight characteristics of the wheel. Standard wheels include a central hub, disposed at the wheel's axis of rolling rotation, with numerous connected spokes extending radially therefrom to connect with the tire supporting wheel rim. Even wheels wherein the spokes have been replaced with a solid disc for aerodynamic purposes still employ a hub. The central hub is then connected to the remainder of the bicycle via the bicycle frame tripletree, i.e. the tubular component which at its upward end is a single tube, operatively connected to the handlebars, and at its lower end includes a tubular forked extension which fits over the sides of the wheel and connects with both axial sides of the hub. The spokes, hub and forked extension of the tripletree add weight to the bicycle which if avoided would make the bicycle desirably lighter. In addition, the spokes, hub and particularly the forked extension of the tripletree hinder the aerodynamics of the bicycle as they frequently axially project beyond the forward profile of the wheel, i.e. the tire axial thickness. Consequently, these pieces of equipment encounter passing air during operation and generate undesirable drag on the bicycle.

In addition to increasing wheel weight and thereby vehicle weight, spokes can be hazardous to persons including the vehicle operator. For instance, when a person is riding a bicycle, rigid materials such as sticks which inadvertently are introduced between into the spokes and the tripletree forked extension can bind the wheel, thereby throwing the rider and subjecting her to injury. Moreover, a person can be seriously injured if her hand is accidentally inserted into the rapidly rotating spokes of a wheel on a wheelchair or a bicycle.

Previous attempted designs for hubless, spokeless wheels for bicycles, such as those disclosed in U.S. Pat. Nos. 4,045,096 and 3,329,444, may be operational but are nonetheless undesirable from a standpoint of optimizing vehicle weight or aerodynamics. Because these designs involve shrouds or frame members which partially encapsulate a significant portion of the ground engaging tread, their forward profile is wider than the tread for much of the height of the wheel and consequently increased drag is present. In addition, the multiplicity of fasteners involved in the assembly of the shrouds and the multiplicity of bearings taught employed add unnecessary weight which is desirable to be reduced.

U.S. Pat. No. 5,071,196 discloses hubless spokeless wheels for motor vehicles apparently having annular bearing means which extend around the entire circumference of the wheel on both its stationary and rotating components. While such a bearing design may be advantageous from a standpoint of fully minimizing friction, and may in fact be necessary in applications where significant weights are being carried, introducing excess bearings in situations such as bicycle racing competitions where minimizing weight is of heightened importance may be counterproductive. In other words, reducing friction by an additional fractional amount by increasing the number of bearings does not merit the concomitant relatively significant increase in weight.

SUMMARY OF THE INVENTION

In one form thereof, the wheel of the present invention is for a vehicle and includes a rotationally stationary inner hoop, a rotatable outer hoop having a bearing engaging surface, a ground engaging tread disposed on the outer hoop, at least one bearing mounted on the inner hoop to be rotationally stationary therewith, and a mechanism for coupling the inner hoop to the vehicle. The at least one bearing includes a support surface contoured to operatively engage the bearing engaging surface such that the outer hoop is axially and radially supported relative to the inner hoop to allow rotation therebetween. The at least one bearing preferably consists of three separate rotating bearings spaced circumferentially around the inner hoop at approximately 120° intervals, and the outer hoop and inner hoop each preferably comprise a woven fiber composite shell.

In another embodiment thereof, the wheel of the present invention is for a vehicle and includes a rotationally stationary inner hoop, a rotatable outer hoop, a ground engaging tread disposed on the outer hoop along its outer radial periphery, at least one bearing mounted on the inner hoop to be rotationally stationary therewith, and a mechanism for coupling the inner hoop to the vehicle. The outer hoop is concentric with the inner hoop and includes a bearing engaging surface along its inner radial periphery. The bearing engaging surface is radially convex. The at least one bearing includes beveled axial edges structured and arranged to engage the bearing engaging surface such that the outer hoop is axially and radially supported relative to the inner hoop to allow rotation therebetween.

In still another form thereof, the hubless wheel of the present invention is for a vehicle and includes a rotatable outer annular component, a rotationally stationary inner annular component, and a mechanism for coupling the inner annular component to the vehicle. The rotatable outer annular component, which includes an axis of rolling rotation and a ground engaging surface along the outer radial periphery, has a woven fiber composite construction. The rotationally stationary inner annular component is concentric with the outer annular component and includes a woven fiber composite construction as well as bearing mechanisms for facilitating the rotation of the rotatable outer annular component relative to the inner annular component.

In still another embodiment thereof, the hubless wheel of the present invention is for a vehicle and includes a rotatable outer hoop, a ground engaging tread, a rotationally stationary inner hoop, a mechanism for coupling the inner hoop to the vehicle, and three separate bearing block assemblies. The rotatable outer hoop includes an axis of rolling rotation, a bearing mechanism engaging surface, and a radially outward surface. The ground engaging tread covers the outer hoop radially outward surface. The rotationally stationary inner hoop is concentric with the outer hoop. The three separate bearing block assemblies are spaced circumferentially at approximately 120° intervals around the inner hoop and are attached thereto so as to be rotationally stationary. The bearing block assemblies also include antifriction bearing mechanisms for facilitating the rotation of the rotatable outer hoop relative to the inner hoop and for axially and radially supporting the outer hoop relative to the inner hoop. The antifriction bearing mechanisms operatively engage the outer hoop along the bearing mechanism engaging surface.

An advantage of the present invention is that the lightweight construction of the wheel allows useful utilization of the wheel in competition bicycles, or in other applications, such as wheelchairs, in which a lighter weight wheel is desirable. Another advantage of the present invention is that its hubless and spokeless design achieves a highly aerodynamic wheel design which promotes superior racing performance. Another advantage of the present invention is that safety can be improved as no rotating spokes potentially harmful to introduced body parts need be employed. Still another advantage of the preferred embodiment pertains to its improved dimensional clearance, which is valuable when the wheel is employed as a wheelchair wheel. For example, because no hub or spokes axially protrude beyond the tire profile, a wheelchair may be able to fit through some passageways otherwise inaccessible to the wheelchair. Other advantages of the present invention will become apparent from the following description.

BRIEF DESCRIPTION OF THE DRAWINGS

FIG. 2 is a side elevational view of the hubless wheel from FIG. 1 detached from the bicycle.

FIG. 3 is a radial partial cross-sectional view, taken along line 3—3 of FIG. 2, showing the concentric annular wheel components of the present invention in section and the bicycle coupling means of the present invention not in section.

FIG. 4 is a radial cross-sectional view, taken along line 4—4 of FIG. 2, of the concentric annular wheel components, wherein the view shows a preferred type of bearing block assembly of the present invention.

FIG. 5 is an exploded view of the bearing block assembly shown in FIG. 4.

FIG. 8 is a radial cross-sectional view, similar to the view shown in FIG. 4, of an alternate bearing block assembly and outer annular component construction of the present invention.

FIG. 9 is a plan view of the completed inner annular component shown in section in FIG. 8, wherein the outer annular component is removed for illustration purposes.

Corresponding reference characters indicate corresponding parts throughout the several Figures.

DESCRIPTION OF THE PREFERRED EMBODIMENTS

Figure 1:
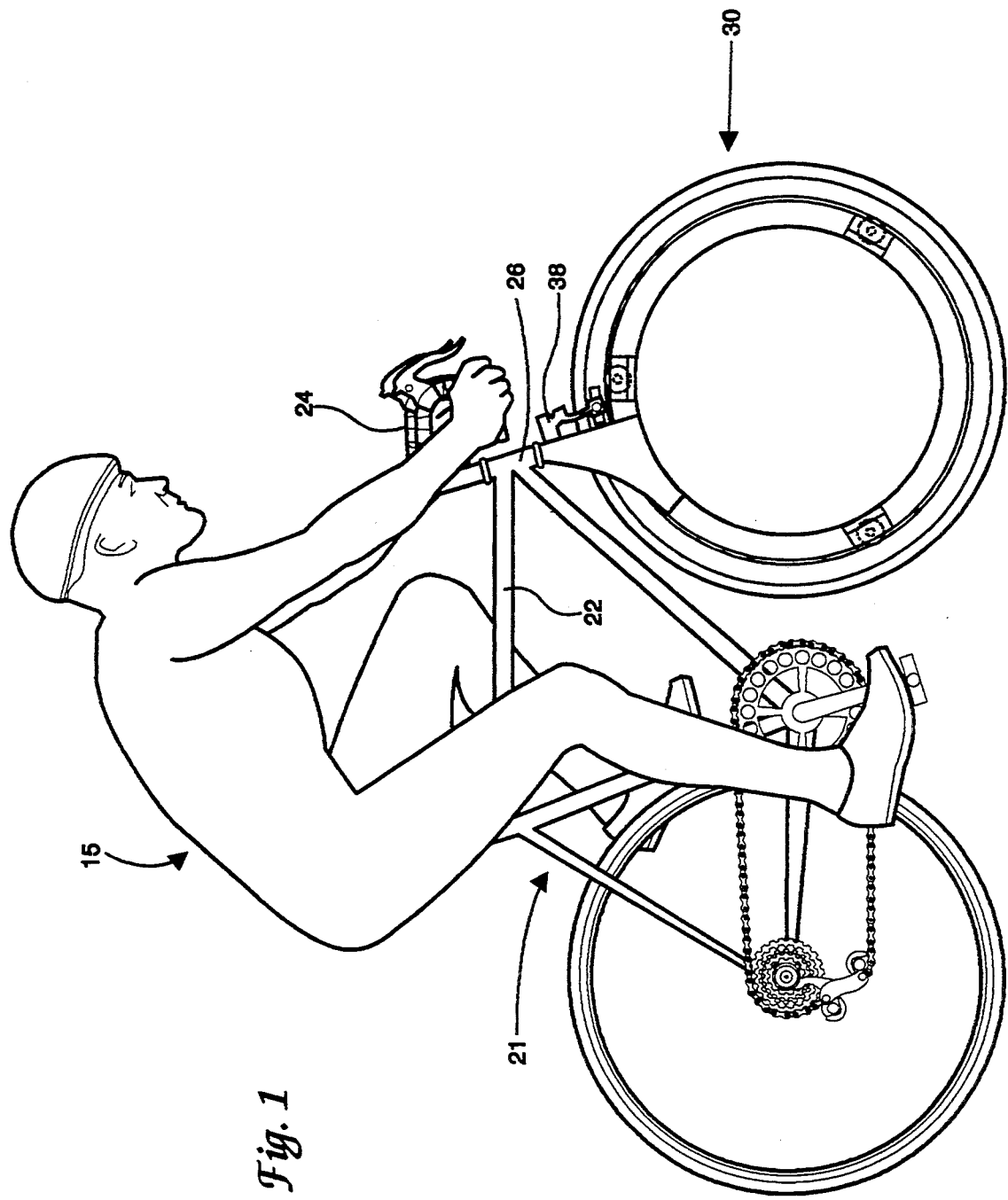
FIG. 1 is a side elevational view of a cyclist on a bicycle having a hubless wheel of the present invention as its front wheel.

Referring now to FIG. 1, there is illustrated one embodiment of the present invention employed as the front wheel, generally designated 30, of a competition bicycle, generally designated 21, being used by cyclist 15. While wheel 30 is shown and further explained herein with reference to bicycles, it is believed that this particular embodiment is merely illustrative of one type of beneficial application of the present invention. The teachings of the present invention are envisioned finding useful application with other vehicles, for instance wheelchairs, where the spokeless feature of the wheel, the lightweight feature of the wheel, the aerodynamic feature of the wheel, or all of these features are beneficial.

Except for wheel 30, bicycle 21 is essentially an ordinary competition bicycle and includes tubular frame 22, handlebars 24, and brake 38. The operative connection between brake 38 and the grips on handlebars 24 is not shown but is well known in the art. The feature of bicycle 21 most relevant to the illustrated invention embodiment is head tube 26. As is typical in the mounting of a front wheel for both recreational and competition bicycles, cylindrical head tube 26 receives a steerer tube 36 (See FIG. 2) extending generally upwardly from wheel 30. As is well known in the art, steerer tube 36 is operatively connected with handlebars 24 within head tube 26. By way of this connection, steerer tube 36 is longitudinally locked within head tube 26 in a manner such that tube 36, and thereby front wheel 30, can still pivot relative to tube 26 to allow cyclist 15 to turn bicycle 21.

For explanation purposes, wheel 30 is shown in FIG. 2 removed from bicycle 21 and with brake 38 removed. Wheel 30 basically comprises a bicycle mounting or coupling mechanism 35, a rotationally fixed inner annular component 70, and a rotatable outer annular component 45. Inner annular component 70 is attached to coupling mechanism 35 such that component 70 does not revolve or otherwise experience rolling rotation during bicycle operation. Outer annular component 45, coupled with inner annular component 70 in a manner to be free to rotate relative thereto during operation, provides the ground engaging surface or tread of wheel 30.

Bicycle coupling mechanism 35, best shown in FIGS. 2 and 3, includes a radially extending hollow steerer tube 36 and a curved stay 37. Steerer tube 36, made of a lightweight metal such as an aluminum alloy, is securely and non-rotationally attached to the outward end 39 of stay 37 and is structured to be slidably inserted into head tube 26. Stay 37 is preferably fabricated from a lightweight composite shell construction, such as the carbon fiber composite having a balsa wood core described hereinbelow with respect to the hoop of outer annular component 45. Bore 42 extends through stay 37 and receives the spindle of brake 38 in the mounting of brake 38. At its inward end 40, stay 37 is securely attached to inner hoop 72 of inner annular component 70, preferably by a chemical bond between their respective composite coatings. This chemical bond, which will be further appreciated after the carbon fiber composite fabrication technique is described below, essentially involves pressing and maintaining together stay 37 and inner annular component 70 when their respective composite coatings are not fully cured and letting these coatings bond with each other during curing. Alternative attachment means including mechanical fasteners such as screws are also feasible, but are less desirable due to their heavier weight.

Referring now to FIGS. 2–4, outer annular component 45 includes a circular outer rim or hoop 49 and a replaceable tire portion 47. The construction of component 45 shown in cross-section in FIGS. 3 and 4 is representative of the entire component circumference. Outer hoop 49 is fabricated to include a high strength, low weight woven fiber composite exterior shell. As used herein, a "composite" refers to the product resulting from the application to a binder of a liquid which cures to a solid. In a preferred construction, the exterior shell of outer hoop 49 is a woven carbon fiber composite. Thus, the carbon fiber is the binder of hoop 49, and the coating applied in the manufacturing process is the liquid which cures to the solid. Other lightweight binders such as kevlar ™, boron fiber and glass fiber may also be utilized and are intended to be within the scope of the present invention. As shown in the cross section of FIG. 4, the hollow interior or core 50 of hoop 49 defined by the composite exterior shell is completely filled with a solid balsa wood member. In addition to contributing to the structural integrity of hoop 49, the balsa wood serves as a permanent mold member about which the load bearing composite shell is formed. By using a balsa wood hoop shaped member as a permanent mold within outer hoop 49, and due to the low density of balsa wood, the manufacturing process is facilitated while only adding a very small amount of weight to the final product wheel 30. While presently a solid core or interior is preferred, other cores are within the scope of the present invention. For instance, the hoop interior within the composite shell could be made hollow instead of being filled with a balsa wood core. This arrangement, however, would complicate the molding process described below. Alternatively, the hoop interior within the composite shell could include a low density foam core to provide extra wheel strength while adding minimal weight.

As best shown in FIG. 4, the exterior shell composite of outer hoop 49 includes a radially outward surface 51, opposing lateral surfaces 53, 54, and a radially inward bearing engaging surface 56. Radially outward surface 51 is radially concave to provide a slight recess to receive the ring-shaped tire portion 47 which wraps around the entire circumference of outer hoop 49. Tire portion 47 is preferably a racing sew-up tire which attaches to outward surface 51 by means of a tacky glue substance, presently used by racing cyclists and therefore well known in the art, applied on outward surface 51. Tire portion 47 is the wheel tread which contacts the ground and, when properly inflated, is sturdy and large enough to prevent any portion of outward surface 51 from pressing into contact with the ground during operation. If punctured, tire portion 47 can be removed from outer hoop 49 by manually pulling it off with sufficient force, substantially leaving the glue substance on radially outward surface 51. Because the glue substance is of the type which does not completely cure, it will maintain its tacky characteristics such that a replacement tire portion 47 aligned and then inflated around outer hoop 49 will also be attached thereto.

Still referring to FIG. 4, radially inward bearing engaging surface 56 is structured to define a generally splayed open V-shape projection extending radially inwardly, with surface portions 64, 65 converging radially inwardly and axially inwardly to a point 66. The included angle of bearing engaging surface 56, i.e. the angle between the converging surface portions, is preferably around 90°. An overlaying thin, V-shaped annular bearing strip 60 made of a durable metal such as hard anodized aluminum alloy is attached to bearing engaging surface 56 to cover the point as well as other areas subject to contact with rotating bearing 110. Bearing strip 60 prevents the carbon fiber composite of surface 56 from being worn away by contact with the rotating bearings described below. In order to provide complete protection, bearing strip 60 also wraps around the hoop circumference.

Referring now to FIGS. 2–3, inner annular component 70 essentially consists of three bearing block assemblies 90 and a circular inner rim or hoop 72 which preferably has neither a central hub nor spokes. Bearing block assemblies 90 are partially disposed in the extended annular space defined by hoop 72 and mount bearings which partially extend beyond the outer radial periphery of hoop 72. Inner hoop 72 is concentric with outer hoop 49, and therefore the central axis of inner hoop 72 is also the axis of rotation for outer annular component 45. The bearing block assemblies 90, which overall are rotationally stationary during operation, are preferably positioned around the circumference of hoop 72 at 120° intervals and with one assembly 90 being located at the top center of hoop 72 when mounted to bicycle 21. Inner hoop 72 is substantially fabricated to have the same type of construction, namely a carbon fiber composite shell with a balsa wood core, as outer hoop 49. Although inner hoop 72 is shown being bullet shaped in cross-section with a solid core 73, alternate aerodynamic constructions including a construction being more sharply V-shaped are within the scope of the invention.

In the illustrated embodiment, inner hoop 72 is primarily assembled from three equally sized arcuate hoop sections 74–76 and three covering inserts or plugs 80–82. Three inner hoop sections and covering inserts are used because three bearing block assemblies 90, which also function to interconnect the hoop sections in this embodiment, are desired to be employed. If a fourth bearing block assembly 90 were desired to be employed, four arcuate inner hoop sections, each spanning about 90°, would preferably be employed. The entire arcuate length of each hoop section 74–76 includes the carbon fiber composite shell. At each end of its arcuate length, the balsa wood core 73 of each inner hoop section 74–76 includes a cavity 78 (see FIG. 6). Cavity 78 is sized to frictionally receive one of the splines 95, 96 of a bearing block assembly during assembly of the inner annular component 70 as well as a balsa wood spline 83, 84 of a covering insert. These covering inserts 80–82 are particularly structured to complete the inner radial periphery of inner hoop 72 at the locations where the arcuate hoop sections terminate to accommodate bearing block assemblies 90. As shown in cross-section in FIGS. 4 and 6, in addition to splines 83, 84, each covering insert 80–82 comprise a balsa wood core 86 with a main rotating bearing accommodating cavity 87. The carbon fiber composite shell covers the radially inward curved surface of core 86, i.e. all but the surface proximate bearing block assembly 90.

Figure 6:
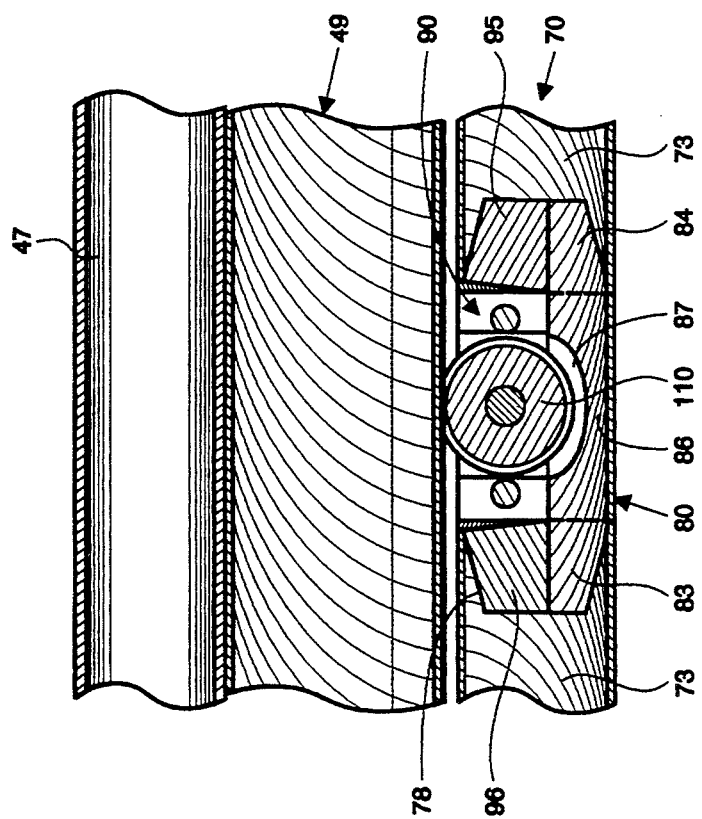
FIG. 6 is a cross-sectional view, taken along line 6—6 of FIG. 4, wherein the half of the bearing block removed in FIG. 4 is also shown.

With reference now to FIGS. 4–6, the function and construction of bearing block assemblies 90 which mount the bearings of the invention will be more particularly described. The illustrated embodiment employs three bearing block assemblies 90 of the preferred type shown, in an exploded view, in FIG. 5. Bearing block assembly 90 includes opposing bearing supports 92, 93 made of a lightweight and strong material such as aluminum. Materials having sufficient strength to withstand the experienced loadings yet which have a lighter weight than aluminum, such as titanium, are even more preferable but may be cost prohibitive. Bearing support 92 is integrally constructed with oppositely projecting splines 95, 96 sized to be inserted into cavity 78 of an inner hoop section. Bearing support 92 includes a substantially parallelpiped base 98, which includes a recess 99 for air circulation purposes formed therein along its axially inside region.

Parallelpiped base 98 includes a central smooth bore 111 which receives main axle 109 such that axle 109 when inserted extends laterally or axially from base 98. A pair of additional smooth axial bores 107 are situated on either side and parallel to main axle 109. Bores 107 each slidingly receive a screw 108 or similar type fastening member which allows for the connection of the opposing bearing supports 92, 93 during final assembly of bearing block assembly 90. Bore 111 and bores 107 are all countersunk at their axially outward end such that the head of main axle 109 and the heads of screw fasteners 108 respectively assemble flush with the outer side surface of bearing support 92. Main axle 109, which is of lightweight aluminum construction, has a threaded inserted end and is slidably passed through main rotating bearing 110 in order to mount this bearing.

In this preferred embodiment, main rotating bearing 110 is a steel ball bearing having a maximum outer diameter of one inch. This bearing was selected to include a PV limit sufficient to withstand expected operating conditions. The PV limit designates a bearing selection criterion known to bearing manufacturers that involves consideration of the expected operational loads and revolutions per minute of the bearing. For purposes of illustration, the balls are not separately shown in cross section, but instead the bearing is shown in solid cross section. The radially outer periphery of bearing 110 includes a support surface specifically contoured to operatively engage bearing engaging surface 56 during wheel use. The preferred support surface contour includes a centered, circumferential V-shaped groove 117 as well as opposing lateral beveled edges 118, 119. Groove 117 is opened at an angle of approximately 90°, or more particularly at an angle or shape which closely approximates and preferably precisely matches the shape of bearing engaging surface 56 of outer hoop 49. As a result, for the preferred outer hoop construction shown, groove 117 of the bearing support surface receives and operatively engages bearing engaging surface 56. The main bearing opposing beveled edges 118, 119, which are oriented at around 45° angles with respect to the axial sides of bearing 110, is the portion of the support surface which receives and engages the bearing engaging surface of another outer hoop construction described below. Bearings of this type of construction are available from Bishop-Wisecarver Corporation of Pittsburg, Calif. When wheel 30 is finally assembled, bearing strip 60 rollingly contacts main rotating bearing 110 along groove 117. This contact or engagement provides both radial support and axial support to outer annular component 45. The longitudinal or axial centering of rotating bearing 110 on main axle 109 is provided and maintained during operation by aluminum axial spacers 112, 113 (See FIG. 4), which are cylindrical sleeves introduced around main axle 109 during assembly.

Mating bearing support 93 is shaped similar to bearing support 92, but is separate from splines 95, 96 such that it can be removed when axle 109 and fasteners 108 are removed. In addition, the pair of bores 114 in support 93 which receive the inserted ends of fasteners 108, as well as bore 115 which receives the inserted end of main axle 109, are threaded so as to provide for a secure connection. Recesses 99 in both bearing supports 92, 93 allow air around main rotating bearing 110 to circulate, thereby decreasing the heating of bearing 110 during its rapid rotation during operation. It will be appreciated that in addition to greatly reducing the friction between inner annular component 70 and rotating outer annular component 45 during operation, the preferred, illustrated rotating bearings of the bearing block assemblies 90 of the present invention are structured so as to maintain the spatial orientation of outer hoop 49 relative to inner hoop 72 and prevent outer annular component 45 from separating from inner annular component 70. While three bearing block assemblies 90 are illustrated herein, more identical bearing block assemblies 90, or blocks with alternate bearing constructions, could be employed if desired. Because of the lower density of inner hoop 72 compared to the bearing block assemblies 90 presently envisioned, it is preferred that only three assemblies 90 be used to thereby desirably achieve the lowest weight wheel 30 while still providing acceptable friction characteristics.

Figure 7:
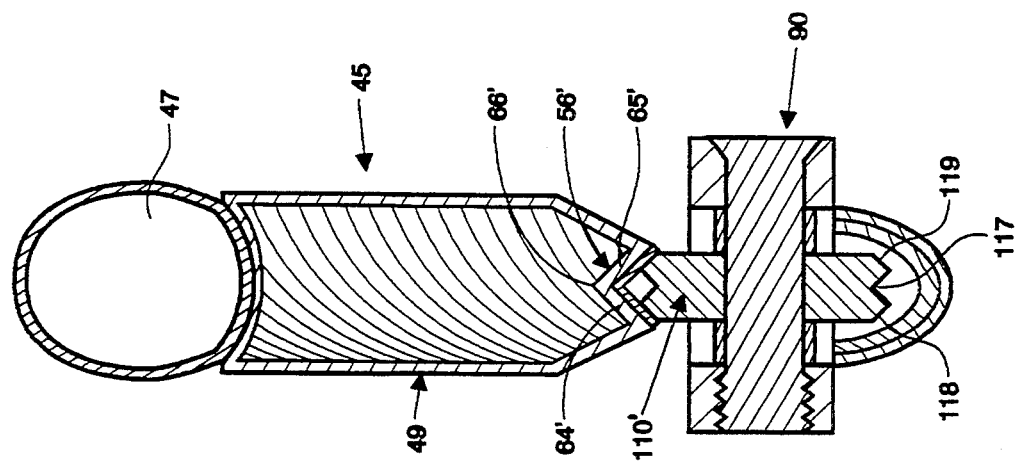
FIG. 7 is a radial cross-sectional view, similar to the view shown in FIG. 4, of an alternate outer annular component construction for use with the preferred bearing block construction.

FIG. 7 illustrates another embodiment of the present invention. The only structural differences between this embodiment and the above embodiment shown in FIGS. 1–6 relate to outer annular component 45. Specifically, instead of extending radially inwardly, the V-shaped structured bearing engaging surface 56' of outer hoop 49 points radially outward. Although shown with a point 66', the portion of surface 56' positioned proximate the axially central portion of bearing 110 need not be pointed, but preferably merely shaped to avoid contact with bearing 110 to thereby avoid friction. The converging surface portions 64', 65' contact the main bearing support surface, namely at the beveled edges 118, 119, through an angled bearing strip 60' attached to surface 56'. It will be appreciated that this operative engagement of bearing 110' with bearing engaging surface 56' provides both axial and radial supporting forces to outer hoop 49 relative to held inner hoop 72. It will also be appreciated that instead of using the model of bearing 110 shown which includes an unused groove 117 in this shown embodiment, beveled edges 118, 119 of main bearing 110 could continue to converge upwardly until they meet, for example at a point. Surface 56' would accordingly be formed to cooperate with this construction and allow for axial and radial support of the outer annular component.

Further modifications to the support surface of the bearings 110 and the bearing engaging surface which yield a complementary relationship therebetween are considered within the scope of the invention. For instance, rather than being triangular in cross-section as shown, groove 117, in conjunction with corresponding changes in bearing engaging surface 56 such that a proper mating to support the wheel components would still result, could be formed in a variety of cross-sectional shapes, including for example rounded and rectangular. Moreover, the bearing support surface need not be formed with a recessed groove 117 on its periphery, but instead could include a projection extending outward which is contoured in one of the above shapes. It will be appreciated that for such constructions the bearing engaging surfaces must be appropriately recessed to engage such a convex support surface or projection. When the main rotating bearings illustrated in FIGS. 1–7 are employed, bearing engaging surface 56 could also be formed with a substantially W-shaped contour, whereby the beveled edges and groove of the bearing support surface all contact the outer annular component.

Figure 10:
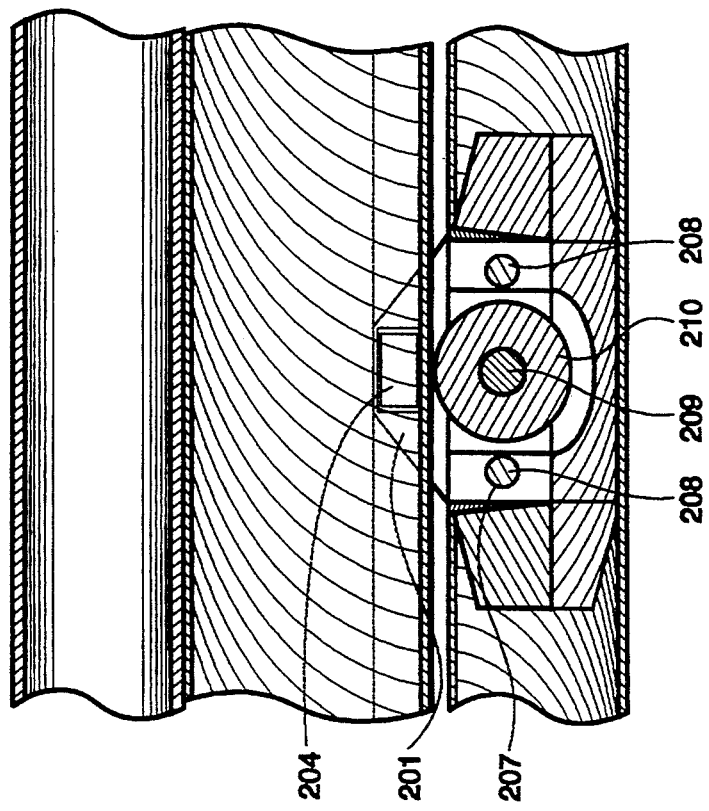
FIG. 10 is a cross-sectional view, taken along line 10—10 of FIG. 8, wherein the half of the bearing block removed in FIG. 8 is also shown.

Referring now to FIGS. 8–10, another alternate embodiment of the present invention is expressly disclosed. With the exception of the structure of the bearing block assemblies and the bearing engaging portions of the outer annular component, the wheel as represented in FIGS. 8–10 is identical to wheel 30 of FIGS. 1–6.

Radially inward bearing engaging surface 156 of outer annular component 145 includes a squared U-shaped or box projection 158, extending inward toward the axis of rotation of the wheel, and opposing beveled surfaces 157, 159. The squared U-shaped projection 158, while shown with three planar composite legs or surfaces disposed 90° from each other, also encompasses designs having legs slightly bowed outward or inward. Thin annular metal bearing strips 160, 161, 162 are respectively attached to the three composite legs of box projection 158. Alternatively, a single, hollow squared U-shaped bearing strip which mates or fits over the inward end of projection 158 could be employed. Bearing strips 160–162 prevent the carbon fiber composite of projection 158 from being worn away by contact with the ball bearings. Box projection 158 extends continuously around the entire circumference of outer annular component 45, and each bearing strip 160–162, in order to provide complete protection, also wraps around the circumference.

Bearing block assemblies 190 comprise three bearings, namely a main ball bearing 210 and a pair of side ball bearings 204, 220 disposed on opposing axial sides of projection 158. Each of these bearings is cylindrical and made of steel. For purposes of illustration, the balls are not separately shown in cross section, but instead all the bearings are shown in solid cross section. Bearing block assembly 190 includes supports 192, 193. Bearing support 192 is integrally constructed with oppositely projecting splines 195, 196, and support 192 includes a substantially parallelpiped base 198 with an axial or side bearing mounting portion 201. Base 198 includes a cavity 199 for air circulation purposes. Axial bearing mounting portion 201 tapers in length upwardly from base 198 and includes a void in which is disposed axial or side rotating bearing 204, rotatably mounted on axle 205. Axle 205 is threaded at its inserted end and threadably engages bearing support 192. Axle 205, made from a lightweight, strong material such as aluminum, is offset axially inward within bearing mounting portion 201 and this offset causes side rotating bearing 204 to extend slightly axially inward and into contact with bearing strip 162. In this embodiment, side rotating bearing 204 is a one-half inch outer diameter ball bearing, well known to those of skill in the art, that achieves a near frictionless contact.

Parallelpiped base 198 includes a central smooth bore 211 which receives main axle 209. A pair of additional smooth axial bores 207 are situated on either side and parallel to main axle 209. Bores 207 each slidingly receive a fastener 208 for connection of the opposing bearing supports 192, 193 during assembly of bearing block assembly 190. Main axle 209, which is of lightweight aluminum construction, has a threaded inserted end and is slidably passed through main or radial rotating bearing 210 in order to mount this bearing. In this embodiment, main rotating bearing 210 has an outer diameter of one inch. When the wheel is finally assembled, main rotating bearing 210 rollingly contacts bearing strip 161 to provide radial support of outer annular component 45. The longitudinal or axially centering of rotating bearing 210 on main axle 209 is provided and maintained during operation by aluminum axial spacers 212, 213, which are cylindrical sleeves introduced around main axle 209 during assembly.

Mating bearing support 193 is similarly shaped to bearing support 192 but is separate from splines 195, 196 such that it can be removed when axle 209 and fasteners 208 are unscrewed. In addition, the pair of bores in support 193 which receive the inserted ends of fasteners 208, as well as the bore which receives the inserted end of main axle 209, are threaded so as to provide for a secure connection. Cavity 199 in both bearing supports 192, 193 allows air around main rotating bearing 210 to circulate to decrease heating of bearing 210 during operation. Bearing support 193, in a manner identical to the mounting of side bearing 204 in bearing support 192, supports and mounts side bearing 220.

It will be appreciated that while three bearing block assemblies 190, each having opposing side bearings, which are axially aligned and which laterally support outer annular component 45, and a main bearing, which radially supports outer annular component 45, are preferred, more bearing block assemblies 190 could be employed if desired. For instance, besides the possibility of using more than three of the bearing block assemblies 190 shown, some bearing block assemblies could merely provide lateral support while other provide merely radial support. However, in any event, it is believed necessary that at least three lateral supporting side bearings be disposed on each wheel side to guide rotating outer annular component 45 and prevent it from wobbling an unacceptable amount side to side, and that at least three radial bearings be used to minimize friction.

Other types of bearings are also envisioned as functional for wheel 30. For instance, instead of using ball bearings for main rotating bearing 110, or for bearing 210 and side bearings 204, 220, ceramic rotating bearings could be substituted. In combination with this change, metal bearing strip 60, or strips 160–162 could be replaced with a hardening coating such as carbide applied to the carbon fiber composite bearing engaging surface. This hardening coating covering the carbon fiber composite protects the composite from unnecessary wear by the ceramic bearings.

Figure 11:
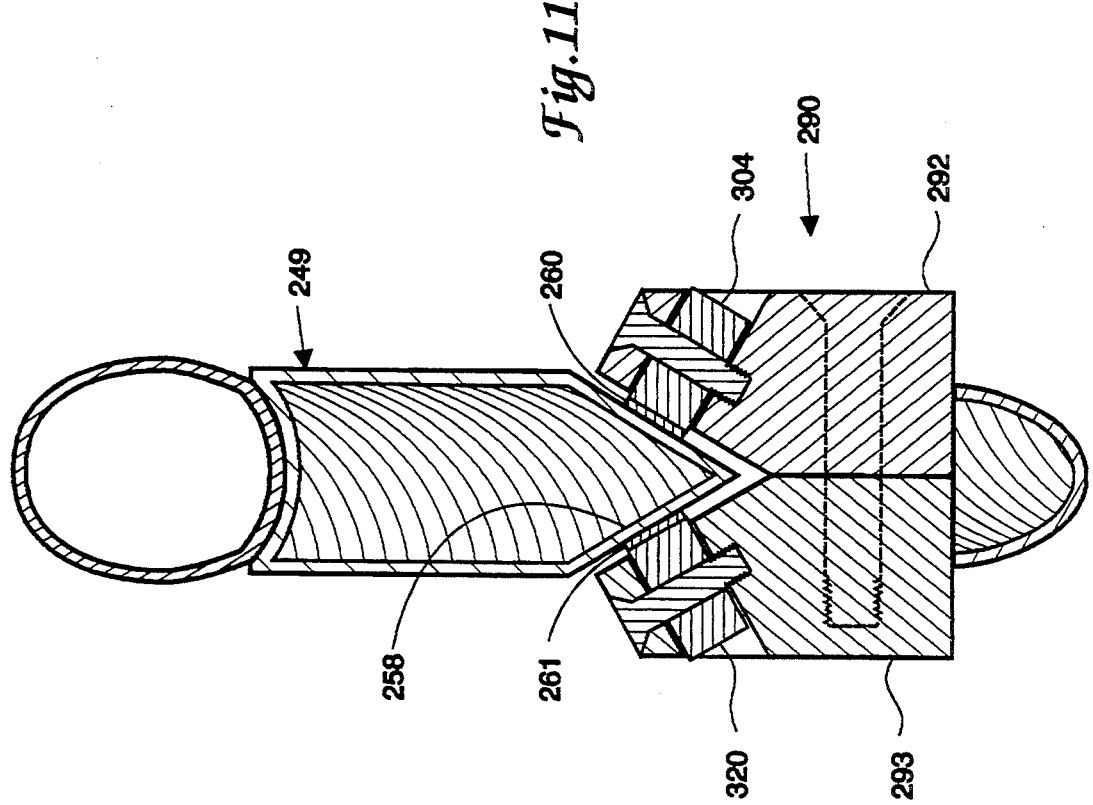
FIG. 11 is a radial cross-sectional view similar to FIG. 4 showing still another alternate bearing block assembly and outer annular component construction of the present invention.

Alternate bearing configurations are also possible. For instance, FIG. 11 shows a cross section of still another alternate outer hoop and bearing block assembly construction. Outer hoop 249 includes a radially inward bearing engaging surface having a V-shaped projection 258, or more particularly described as including opposing sloped side surfaces. Bearing block assembly 290 includes bearing supports 292, 293 with angled side rotating bearings 304, 320, which operatively engage the sloped sides of projection 258 via metal bearing strips 260, 261 attached to projection 258. It will be appreciated that angled cylindrical rotating bearings 304, 320, each of which have an axis of rotation which is parallel to the proximate sloped surface of projection 258, provide both a lateral and radial supporting force to the rotating outer wheel component. In addition, and in conjunction with projection 258, rather than providing angled cylindrical rotating bearings, side rotating bearings with beveled surfaces, i.e. frustoconical in shape, could be mounted in the supports in bearing block assemblies which were similar to bearing supports 192, 193 of bearing block assembly 190.

Another bearing assembly envisioned involves replacing the metal bearing strips and the various rotating bearings described above with bearing devices which slidingly, rather than rollingly, engage each other. For instance, a circumferential TEFLON ™ strip could be substituted for each of the bearing strips, for example bearing strip 60 or strips 160–162 or strips 260–261, above. And, in combination with these strips, a stationary and non-rolling TEFLON ™ pad could be substituted for each rotating bearing, for example bearing 110 or bearings 204, 210, 220 or bearings 304, 320. Treatment of theses strips and pads with a dry lubricant known in the art may reduce sliding friction to an acceptable level such that such a constructed wheel 30 would operate with adequate efficiency.

The above configuration of wheel 30 will be understood furthered when considered in view of the following explanation of its present production. Balsa wood molds, which in the final product are encased to form the inner and outer hoop cores, or partially covered to form the covering insert cores, are provided in the proper sizes. For example, a 360° circular balsa piece for outer hoop 49 and three around 120° arcuate sections with hollowed out ends, each section having an outer radius less than the inner radius of the 360° circular balsa piece, for inner hoop 72 are provided. Separate pieces of woven carbon fiber fabric, which at this point are still flexible, are then wrapped in a single layer of thickness around the separate balsa wood cores. The carbon fiber fabric preferably employed weighs approximately twenty-two ounces (624 grams) per square yard and is available from Newport Adhesives and Composites, Inc. of Santa Ana, Calif. This fabric, due to its fibrous makeup, has a porous construction. With the carbon fiber material so wrapped and in place, the composite coating is employed to harden the carbon fiber material into the carbon fiber composite having the strength necessary for wheel 30.

It is known in the art of composite coatings that numerous coatings, such as an assortment of long chain polymers, can be employed to stiffen items such as fibrous fabrics. Coatings comprising a wide variety of one or more long chain polymers may be used to stiffen the flexible woven fabric used in manufacturing wheel 30. Although a preferred coating composition is identified hereinbelow, one skilled in the art will recognize that other suitable long chain polymeric compositions may be substituted without departing from the teachings of the present invention. A urethane composition available from Ad-Tech of Charlotte, Mich. is presently preferred to harden or stiffen the carbon fiber fabric. This composition, identified by the manufacturer as EL-301, is supplied by the manufacturer as an unmixed, two-part mixture comprising a resin (designated "Part A" by the manufacturer) and a hardener (designated "Part B" by the manufacturer). The manufacturer's suggested mixture combination of EL-301 is 100 parts by weight Part A with 25 parts by weight Part B. The resulting urethane has a hardness of 88 D.

The EL-301 urethane is prepared by mixing the two part mixture according to the manufacturer's suggested combination specified above, and is then applied onto the exterior of the carbon fiber fabric covering the balsa wood core. For example, at a room air temperature about 77° F. (25° C.), the application of the EL-301 urethane should occur within twenty minutes after mixing, as further delay makes application more difficult as the urethane begins to slightly harden. At a room air temperature above about 77° F. (25° C.), the urethane should generally be applied within a shorter time period, as it begins to harden more quickly at higher temperatures. Conversely, at a room air temperature below about 77° F. (25° C.), the urethane may be applied over longer periods of time. The coating is applied to a generally uniform thickness by brush. An application of approximately 3 grams of the EL-301 urethane mixture per square inch of carbon fiber fabric of wheel 30 is preferred. Rather than brush application, the composite coating may instead be spray applied.

After application of the urethane coating, the wheel 30, and more particularly its carbon fiber composite shell, is left to cure at room temperature for the next five to seven days to allow it to reach its maximum strength. During this curing time after application of the coating, stay 37 will be pressed together with arcuate hoop section 74 to allow chemical bonding therebetween. Because the applied urethane coating penetrates the voids or interstices of the porous fibrous fabric before it solidifies, the coating adheres tightly to the fabric and will not chip off or otherwise be easily removed.

After the composite hoop sections and inserts have finally cured, wheel 30 can be assembled. Outer annular component 45 is assembled by adhesively connecting tire 47 to concave outer surface 51 of outer hoop 49. Inner annular component 70 is separately assembled by interconnecting inner hoop sections 74–76 via bearing block assemblies 90 and covering inserts 80–82. For example, spline 95 of bearing block assembly 90 and spline 83 of covering insert 80 are tightly inserted into cavity 78 in hoop core 73 of inner hoop section 74. An adhesive is included between the core cavity and splines to ensure a secure attachment. The opposite ends of bearing block assembly 90 and covering insert 80, namely spline 96 and spline 84, are identically used to attach inner hoop section 75.

Inner annular component 70 and outer annular component 45 are assembled together by removing bearing supports 93 and main rotating bearings 110 from the bearing block assemblies 90 and concentrically inserting inner annular component 70 into the central aperture of outer annular component 45. When the annular components are properly aligned, the bearings are inserted, and the three bearing supports 93 are then connected to their respective bearing supports 92. The lightweight hubless wheel 30 of the present invention is then ready for attachment to bicycle 21 for operation.

While this invention has been described as having a number of preferred designs, the present invention may be further modified within the spirit and scope of this disclosure. For instance, the hoop interior within the composite shell could be made hollow or could be filled with a low density foam core. In addition, with associated changes in the hoop constructions, the various bearing block assemblies could be mounted on the outer hoop so as to be rotatable therewith. Furthermore, in vehicles such as wheelchairs, the coupling mechanism need not extend radially outward beyond the outer annular component, but could instead reside within the circular opening defined by the inner annular component. This application is therefore intended to cover any variations, uses, or adaptations of the invention using its general principles. Further, this application is intended to cover such departures from the present disclosure as come within known or customary practice in the art to which this invention pertains.

What is claimed is:

1. A wheel for a vehicle comprising:
   a rotationally stationary inner hoop;
   a rotatable outer hoop comprising a bearing engaging surface;
   a ground engaging tread disposed on said outer hoop;
   at least one first bearing mounted on said inner hoop to be rotationally stationary therewith, said at least one first bearing comprising a support surface contoured to operatively engage said bearing engaging surface such that said outer hoop is axially and radially supported relative to said inner hoop to allow rotation therebetween;
   at least two second bearings, mounted on said inner hoop to be rotationally stationary therewith, for engaging said bearing engaging surface and radially supporting said outer hoop relative to said inner hoop to allow rotation therebetween, said at least two second bearings and said at least one first bearing circumferentially spaced around said inner hoop; and
   means for coupling said inner hoop to the vehicle.

2. The wheel of claim 1 wherein said at least one first bearing comprises a rotating bearing, and wherein said support surface comprises the radial periphery of said rotating bearing.

3. The wheel of claim 1 wherein said at least one first bearing and said at least two second bearings together consist of three separate rotating bearings spaced circumferentially around said inner hoop at approximately 120° intervals.

4. The wheel of claim 1 wherein said outer hoop and said inner hoop each comprise a woven fiber composite shell.

5. The wheel of claim 4 wherein said woven fiber composite shells of said outer hoop and said inner hoop each comprise a carbon fiber composite shell, and wherein said outer hoop and said inner hoop each further comprise a balsa wood core.

6. The wheel of claim 1 wherein said at least one first bearing comprises a rotating bearing, and wherein said support surface comprises a groove that circumferentially extends around said rotating bearing.

7. The wheel of claim 6 wherein said groove is axially centered and is substantially triangular in radial cross-sectional shape.

8. The wheel of claim 1 wherein said at least one first bearing comprises a rotating bearing, and wherein said support surface comprises an outward projection, substantially triangular in radial cross-sectional shape, that circumferentially extends around said rotating bearing.

9. The wheel of claim 1 wherein said at least one first bearing comprises a non-rolling pad bearing.

10. The wheel of claim 1 further comprising an annular bearing strip, attached to said bearing engaging surface, for protecting said bearing engaging surface from direct wearing contact with said support surface of said of at least one first bearing.

11. A wheel for a vehicle comprising:
    a rotationally stationary inner hoop;
    a rotatable outer hoop, concentric with said inner hoop, comprising a bearing engaging surface along its inner radial periphery, said surface being radially convex;
    a ground engaging tread disposed on said outer hoop along its outer radial periphery;
    at least one bearing mounted on said inner hoop to be rotationally stationary therewith, said at least one bearing comprising beveled axial edges structured and arranged to engage said bearing engaging surface such that said outer hoop is axially and radially supported relative to said inner hoop to allow rotation therebetween; and
    means for coupling said inner hoop to the vehicle.

12. The wheel of claim 11 wherein said at least one bearing consists of three separate rotating bearings spaced circumferentially around said inner hoop at approximately 120° intervals.

13. A hubless wheel for a vehicle comprising:
    a rotatable outer annular component comprising an axis of rolling rotation and a ground engaging surface along the outer radial periphery, wherein said outer annular component comprises a woven fiber composite construction;
    a rotationally stationary inner annular component concentric with said outer annular component and comprising a woven fiber composite construction, said inner annular component further comprising bearing means for facilitating the rotation of said rotatable outer annular component relative to said inner annular component; and
    means for coupling said inner annular component to the vehicle.

14. The hubless wheel of claim 13 wherein said outer annular component comprises a bearing engaging surface, and wherein said bearing means comprises a plurality of bearings spaced circumferentially around said inner annular component, said plurality of bearings each comprising a support surface contoured to operatively engage said bearing engaging surface for radially and laterally supporting said outer annular component relative to said inner annular component.

15. The hubless wheel of claim 13 wherein said outer annular component comprises a bearing engaging surface having a radially inward projection being generally U-shaped in radial cross section, and wherein said bearing means comprises a plurality of radial bearings for radially supporting said outer annular component, said radial bearings spaced circumferentially around said inner annular component, and wherein said bearing means comprises a plurality of side bearings for laterally supporting said outer annular component relative to said inner annular component, said side bearings spaced circumferentially around said inner annular component.

16. The hubless wheel of claim 13 wherein said outer annular component comprises a bearing engaging surface including sloped side surfaces, and wherein said bearing means comprises bearings operatively engaging said sloped side surfaces for radially and laterally supporting said outer annular component relative to said inner annular component, said bearings spaced circumferentially around said inner annular component.

17. The hubless wheel of claim 16 wherein said sloped side surfaces are disposed on opposite sides of a single radially inward projection and converge radially and axially inwardly.

18. A hubless wheel for a vehicle comprising;
   a rotatable outer hoop comprising an axis of rolling rotation, a bearing means engaging surface, and a radially outward surface;
   a ground engaging tread covering said outer hoop radially outward surface;
   a rotationally stationary inner hoop, said inner hoop being concentric with said outer hoop;
   means for coupling said inner hoop to the vehicle; and
   three separate bearing block assemblies spaced circumferentially at approximately 120° intervals around said inner hoop and attached thereto so as to be rotationally stationary, said bearing block assemblies comprising antifriction bearing means for facilitating the rotation of said rotatable outer hoop relative to said inner hoop and for axially and radially supporting said outer hoop relative to said inner hoop, said antifriction bearing means operatively engaging said outer hoop along said bearing means engaging surface.

19. The hubless wheel of claim 18 wherein said outer hoop bearing means engaging surface comprises a radially inward projection being square U-shaped in radial cross section.

20. The hubless wheel of claim 18 wherein said outer hoop bearing means engaging surface comprises a radially inward projection having opposing sloped side surfaces.

21. The hubless wheel of claim 18 wherein said outer hoop and said inner hoop each further comprise a woven fiber composite shell.

22. The wheel of claim 1 wherein at least two of said second bearings each further comprise a support surface contoured to operatively engage said bearing engaging surface such that said outer hoop is axially supported relative to said inner hoop.

* * * * *